(12) United States Patent
Miyamoto

(10) Patent No.: US 8,340,475 B2
(45) Date of Patent: Dec. 25, 2012

(54) DATABASE PRODUCTION METHOD, DATABASE PRODUCTION PROGRAM, DATABASE PRODUCTION APPARATUS AND IMAGE CONTENT RECORDING APPARATUS

(75) Inventor: Masaru Miyamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 11/876,383

(22) Filed: Oct. 22, 2007

(65) Prior Publication Data

US 2008/0166051 A1 Jul. 10, 2008

(30) Foreign Application Priority Data

Oct. 24, 2006 (JP) ................. P2006-289027

(51) Int. Cl.
 G06K 9/46 (2006.01)
 G06K 9/66 (2006.01)
 G06K 9/54 (2006.01)
 G06K 9/60 (2006.01)
 G06F 7/00 (2006.01)
 G06F 17/30 (2006.01)

(52) U.S. Cl. ........ 382/305; 382/190; 382/306; 707/705; 707/706; 707/707; 707/790; 707/800; 707/802

(58) Field of Classification Search .......... 382/190, 382/305, 306; 707/705–707, 790, 800, 802
 See application file for complete search history.

(56) References Cited

U.S. PATENT DOCUMENTS

| | | | | |
|---|---|---|---|---|
| 5,818,439 A | * | 10/1998 | Nagasaka et al. | 725/87 |
| 6,564,206 B1 | * | 5/2003 | Ikeda | 707/722 |
| 6,965,701 B2 | * | 11/2005 | Tojo | 382/239 |
| 7,391,917 B2 | * | 6/2008 | Ohta et al. | 382/253 |
| 7,487,524 B2 | * | 2/2009 | Miyamori | 725/34 |
| 7,657,096 B2 | * | 2/2010 | Hosoda et al. | 382/190 |
| 7,848,598 B2 | * | 12/2010 | Nagatani et al. | 382/305 |
| 2001/0049826 A1 | * | 12/2001 | Wilf | 725/120 |
| 2004/0024758 A1 | * | 2/2004 | Iwasaki | 707/3 |
| 2005/0084244 A1 | | 4/2005 | Murabayashi | |
| 2005/0278379 A1 | * | 12/2005 | Nakazawa | 707/104.1 |

FOREIGN PATENT DOCUMENTS

| | | |
|---|---|---|
| JP | 08-095986 | 4/1996 |
| JP | 09-107517 | 4/1997 |
| JP | 2002-344872 | 11/2002 |
| JP | 2003-036259 | 2/2003 |
| JP | 2004-110448 | 4/2004 |
| JP | 2005-057360 | 3/2005 |

(Continued)

*Primary Examiner* — Matthew Bella
*Assistant Examiner* — Jose M Torres
(74) *Attorney, Agent, or Firm* — Finnegan, Henderson, Farabow, Garrett & Dunner, L.L.P.

(57) ABSTRACT

The present invention provides a database production method including: a representative image selection step of selecting certain images each as a representative image which represents an image content from the image content; a display processing step of causing a display apparatus to display the representative image; an operation inputting step of allowing a user to input image text information corresponding to the representative image; and a database production step of registering representative characteristic information extracted from the representative image in accordance with a predetermined extraction method and the image text information inputted at the operation inputting step in an associated relationship with each other to produce a database for acquiring, using arbitrary image characteristic information for each image extracted from an arbitrary image content in accordance with the extraction method, substance character information corresponding to an image which the arbitrary image content has.

17 Claims, 10 Drawing Sheets

FOREIGN PATENT DOCUMENTS

| | | |
|---|---|---|
| JP | 2005-065185 | 3/2005 |
| JP | 2005-352782 | 12/2005 |
| JP | 2006-050370 | 2/2006 |
| JP | 2006-054619 | 2/2006 |
| JP | 2006-101156 | 4/2006 |
| WO | WO 2005/050986 | 6/2005 |

* cited by examiner

FIG.5

| REPRESENTATIVE CHARACTERISTIC INFORMATION IDENTIFIER | TEXT INFORMATION |
|---|---|
| ×○□×○−○●○●○○ | FOOTRACE |
| ×○□×○−○○×××× | BALL THROWING-IN GAME |
| ×○□×○−●●××▲△ | ATHLETIC MEET |
| ☆☆○○△−××○○△△ | SEA |
| ☆☆○○△−××△△○△ | SHELL |
| ☆☆○○△−××△●○○ | SHELL |
| △●□×●−□□△○●● | SEA |
| △●□×●−■□○××○ | SEA |
| ●●▲☆□−△△○×□□ | MT. FUJI |

42 (table), TX, Tidr, IMAGE DATA ID, SEQUENTIAL NUMBER

FIG. 7

| IMAGE DATA ID (Ci) | TITLE (Ct) | IMAGE PICKUP DATE AND HOUR (Cd) | TITLE CANDIDATE TEXT (Ca) | INPUT (Ce) | THUMBNAIL (Cs) |
|---|---|---|---|---|---|
| ×□×○ | | 2006/9/14 (THURS.) 4:56PM | AIRPLANE, SEA, MT.FUJI, THE SHINKANSEN, SKY, MOUNTAIN, CLOUD, MOUNTAIN CLIMBING, LUNCH, SNOW | INPUT 1 | |
| ☆☆○○△ | | 2006/7/31 (MON.) 11:47PM | ATHLETIC MEET, FOOTRACE, BALL THROWING-IN GAME, HEADBAND, LUNCH, THE FIRST PRIZE, PLAYGROUND, SKY, CLOUD | INPUT 1 | |
| △○□×● | SHELLFISH GATHERING | 2006/7/18 (TUES.) 3:27PM | SEA, MOUNTAIN, CLOUD, SHELL SHELLFISH GATHERING, CAP, RAKE, SAND | INPUT 2 | ☆☆○○△−××△△○△ |
| ××○○○ | SEA BATHING | 2006/7/14 (FRI.) 11:15PM | FLOATATION RING, SEA, SEA BATHING, SEASIDE COTTAGE, SHELL, BEACH PARASOL, SKY, CAP, SKY, SWIMMING SUIT | DV | △○□×○−■□○××○ |

DATABASE PRODUCTION METHOD, DATABASE PRODUCTION PROGRAM, DATABASE PRODUCTION APPARATUS AND IMAGE CONTENT RECORDING APPARATUS

CROSS REFERENCES TO RELATED APPLICATIONS

The present invention contains subject matter related to Japanese Patent Application JP 2006-289027 filed in the Japan Patent Office on Oct. 24, 2006, the entire contents of which being incorporated herein by reference.

BACKGROUND OF THE INVENTION

1. Field of the Invention

This invention relates to a database production method, a database production program, a database production apparatus and an image content recording apparatus suitable for use with a hard disk recorder for recording various image data such as, for example, pickup image data of a video camera, a ground wave digital broadcasting program or the like.

2. Description of the Related Art

A hard disk recorder in related art is available which not only records a television broadcasting program is recorded but also automatically produces a management list for managing the television broadcasting program. The hard disk recorder records text information representative of a title, the substance and so forth of the television broadcasting program into the management list such that it can be utilized for list display, search for a television broadcasting program and so forth.

Such a hard disk recorder as just described acquires EPG (Electric Program Guide) information, which represents a distribution schedule, the title, the substance and so forth of television broadcasting programs, as text information from a broadcasting signal distributed, for example, by ground wave digital broadcasting.

Another hard disk recorder is proposed, for example, in Japanese Patent Laid-open No. 2003-36259. The hard disk recorder acquires text information which a streaming content has in order to record the information into a management list for managing streaming contents distributed through the Internet or the like and utilize the information for search and so forth.

SUMMARY OF THE INVENTION

Incidentally, a hard disk recorder is configured such that not only ground wave digital broadcasting programs and streaming contents but also private data such as, for example, pickup image data picked up by a video camera, edit data edited by a user itself and so forth can be recorded as image contents. However, the hard disk recorder has a problem that, since such private data does not have text information, which represents a title or the content, added thereto, the hard disk recorder is difficult to acquire text information which represents the substance of the private data.

Therefore, it is demanded to provide a database production method, a database production program, a database production apparatus and an image content recording apparatus by which a database of substance character information associated with image contents can be produced readily.

According to an embodiment of the present invention, there is provided a database production method including a representative image selection step of selecting certain images each as a representative image which represents an image content from the image content, a display processing step of causing a display apparatus to display the representative image, an operation inputting step of allowing a user to input image text information corresponding to the representative image, and a database production step of registering representative characteristic information extracted from the representative image in accordance with a predetermined extraction method and the image text information inputted at the operation inputting step in an associated relationship with each other to produce a database for acquiring, using arbitrary image characteristic information for each image extracted from an arbitrary image content in accordance with the extraction method, substance character information corresponding to an image which the arbitrary image content has.

With the database production method, a database can be produced by causing a user to execute a simple operation of inputting image text information corresponding to a displayed representative image.

According to another embodiment of the present invention, there is provided an image content recording apparatus including a recording section configured to record an image content, a representative image selection section configured to select certain images each as a representative image which represents the image content from the image content, a display processing section configured to cause a display apparatus to display the representative image, an operation inputting section configured to allow a user to input image text information corresponding to the representative image, and a database production section configured to register representative characteristic information extracted from the representative image in accordance with a predetermined extraction method and the image text information inputted by the operation inputting section in an associated relationship with each other to produce a database for acquiring, using arbitrary image characteristic information for each image extracted from an arbitrary image content in accordance with the extraction method, substance character information corresponding to an image which the arbitrary image content has.

With the image content recording apparatus, a database can be produced by causing a user to execute a simple operation of inputting image text information corresponding to a displayed representative image.

With the database production method and the image content recording apparatus, a database can be produced by causing a user to execute a simple operation of inputting image text information corresponding to a displayed representative image as described above. Consequently, a database of substance character information associated with an image content can be produced readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 5 is a view illustrating an image text database shown in FIG. 2;

FIG. 7 is a view illustrating a pickup image data management list shown in FIG. 6;

DETAILED DESCRIPTION OF THE PREFERRED EMBODIMENT

1. General Configuration of the Hard Disk Recorder

Figure 1:
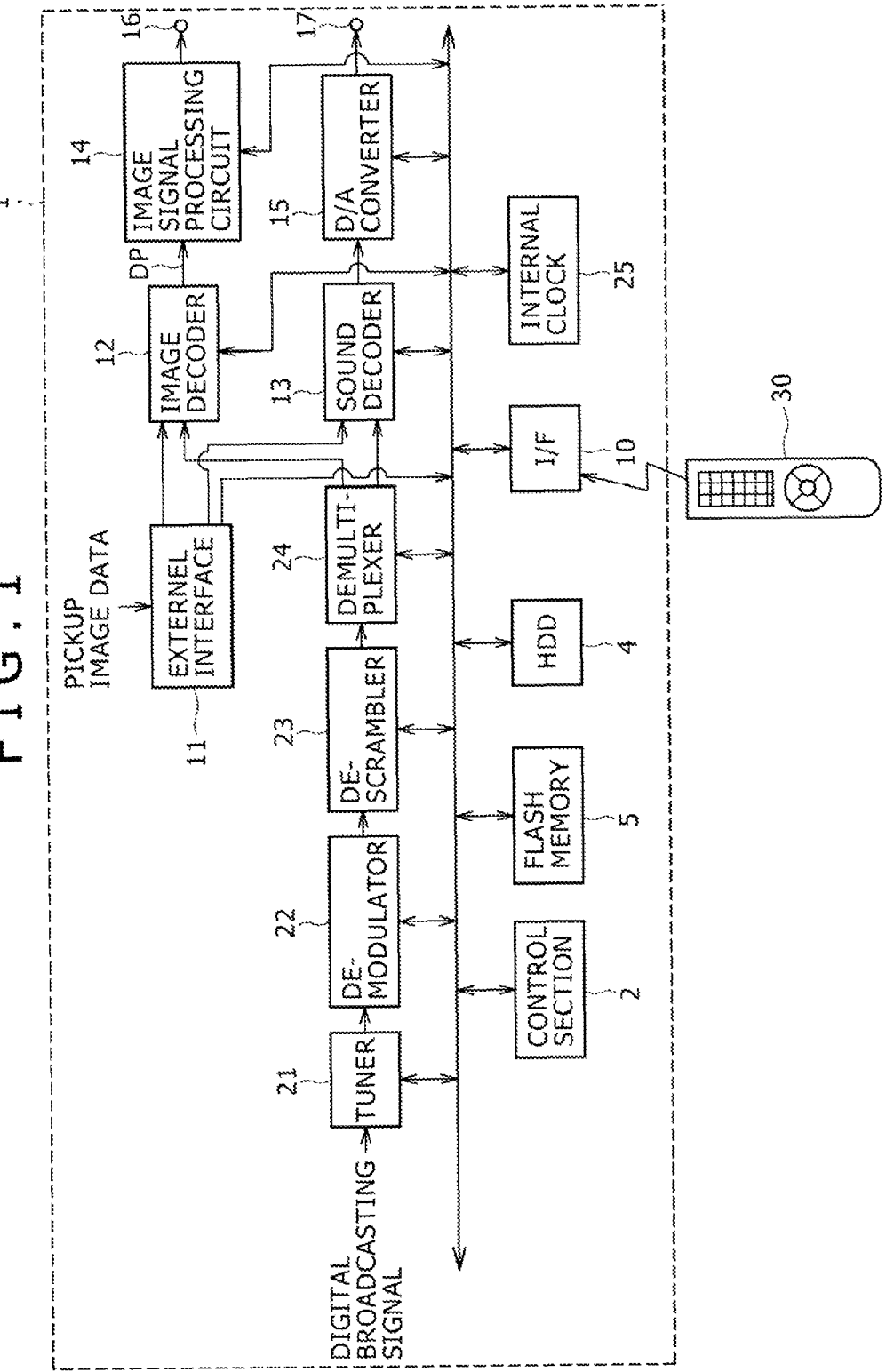
FIG. 1 is a block diagram showing a general configuration of a hard disk recorder to which the embodiment of the present invention is applied.

Referring first to FIG. 1, there is shown a hard disk recorder to which the embodiment of the present invention is applied. The hard disk recorder is generally denoted by 1 and generally configured such that it can record pickup image data as an image content inputted thereto from a video camera not shown and receive and record a television broadcasting program of ground wave digital broadcasting.

In the hard disk recorder 1, a control section 2 formed from a CPU (Central Processing Unit), a ROM (Read Only Memory) and a RAM (Random Access Memory) not shown generally controls the entire hard disk recorder 1. The control section 2 develops a basic program, a database production program, a title candidate display program and so forth stored in the ROM or a hard disk drive 4 into the RAM and executes various processes or a text database production process and a title candidate display process hereinafter described based on the programs.

If a request is issued from an external remote controller 30 operated by a user, then the hard disk recorder 1 acquires an operation signal produced by the remote controller 30 through a remote controller interface 10 and supplies the acquired signal to the control section 2.

For example, if an operation signal which represents a recording request to record pickup image data held by a video camera (not shown) connected to an external interface 11 of the hard disk recorder 1 is supplied from the remote controller interface 10, then the control section 2 executes a recording process of the pickup image data.

In particular, the control section 2 controls the hard disk drive 4 to record the pickup image data inputted thereto from the video camera (not shown) through the external interface 11 as recorded image pickup data. At this time, the control section 2 adds a pickup image data ID formed from a serial number or the like to the recorded image pickup data.

Further, the control section 2 registers image pickup date and hour information added to the pickup image data and input information in an associated relationship with the pickup image data ID to produce a pickup image data management list 43 hereinafter described in detail as a management list. The image pickup date and hour information represents, for example, the date and hour of image pickup, date and hour of editing and so forth. Meanwhile, the input information represents that one of input terminals of the external interface 11 through which the pickup image data is inputted. The pickup image data management list 43 produced by the control section 2 is recorded into a flash memory 5.

Further, if an operation signal which represents a reproduction request to reproduce the recorded image pickup data recorded in the hard disk drive 4 is supplied from the remote controller interface 10, then the control section 2 executes a reproduction process of the recorded image pickup data.

In particular, the control section 2 reads out the recorded image pickup data designated by the user from the hard disk drive 4 and transmits reproduction image data and sound data from within the recorded image pickup data to an image decoder 12 and a sound decoder 13, respectively.

The control section 2 decodes the reproduction image data by means of the sound decoder 12 in accordance with a predetermined decoding method. Further, the control section 2 executes a conversion process of a decoded reproduction image signal DP into an analog signal, a mixing process and so forth by means of an image signal processing circuit 14 and then signals the resulting signal to an image output terminal 16. As a result, the control section 2 controls a display apparatus not shown connected to the image output terminal 16 to display an image based on the reproduction image signal DP.

Further, the control section 2 decodes the sound data by means of the sound decoder 13 in accordance with a predetermined decoding method and converts the decoded sound signal into an analog signal by means of a digital/analog converter 15. Then, the control section 2 signals the resulting signal to a sound output terminal 17. As a result, the control section 2 controls a speaker not shown connected to the sound output terminal 17 to output sound based on the sound data.

In this manner, the hard disk drive 1 records and reproduces an image content such as pickup image data inputted thereto from the external interface 11.

Further, if an operation signal which represents a picture recording request to record a television broadcasting program being currently broadcast is issued from the remote controller interface 10, then the control section 2 receives the television broadcasting program being currently broadcast and executes a picture recording process of the television broadcasting program.

In particular, the control section 2 controls a tuner 21 to select and receive a digital broadcasting signal of a frequency band of a selected channel and signals the digital broadcasting signal to a demodulator 22. The control section 2 controls the demodulator 22 to demodulate the digital broadcasting signal and controls a descrambler 23 to descramble the demodulated digital broadcasting signal. Then, the control section 2 controls a demultiplexer 24 to demultiplex the descrambled digital broadcasting signal into packets of broadcast image data, sound data and EPG information. Then, the control section 2 records the broadcast image data and sound data as a recorded program into the hard disk drive 4.

Further, when the recording process is to be ended, the control section 2 registers the recording date and hour of the television broadcasting program acquired from an internal clock 25, title information of the recorded program extracted from EPG (Electric Program Guide) information, program text information which represents the substance of the recorded program, and so forth to produce a recorded program management list. The recorded program management list thus produced is recorded into the flash memory 5.

Further, if an operation signal which represents a display request to display a list of recorded programs recorded in the hard disk drive 4 is issued from the remote controller interface 10, then the control section 2 reads out the recorded program management list from the flash memory 5. Then, the control section 2 produces image data based on the recorded program management list and then signals the produced image data to the image decoder 12. As a result, the control section 2 executes a process similar to the reproduction process for recorded image pickup data to control the display apparatus not shown to display a program table based on the recorded program management list.

In this manner, the hard disk recorder 1 executes, in addition to a recording process and a reproduction process of pickup image data inputted thereto through the external interface 11, a process of recording a television broadcasting program currently being broadcast as a recorded program. Further, the hard disk recorder 1 can control the display apparatus to display a program table including the title information and so forth of the recorded program management list produced automatically using EPG information based on the recorded program management list in response to a demand of the user.

2. Production of the Image Text Database

Incidentally, text information which represents the title and the substance of pickup image data is not added to pickup image data inputted through the external interface 11 as described above. Therefore, a hard disk drive in related art is difficult to automatically register, at a point of time when pickup image data is recorded, text information which suggests the title which represents the substance of recorded image pickup data or the substance of the pickup image data into the pickup image data management list 43.

Various techniques are generally known. Characteristic information which represents a characteristic of an image is extracted from image data such as pickup image data or the like, and a method has been proposed by which the similarity between images can be decided using the characteristic information. It is considered that, where a plurality of images are similar to each other, the substances which the images represent are substantially same as each other. Therefore, it is considered that the probability is high that text information which represents the substance of one of the images may represent also the substance of the other image decided to be similar.

Accordingly, it is considered that, if the hard disk recorder 1 has a database in which image text information corresponding to characteristic information of an image is recorded, then the hard disk recorder 1 can use the characteristic information to detect an image similar to the image held by the recorded image pickup data and utilize image text information corresponding to the characteristic information of the detected image as substance character information which suggests the substance of the recorded image pickup data.

Figure 2:
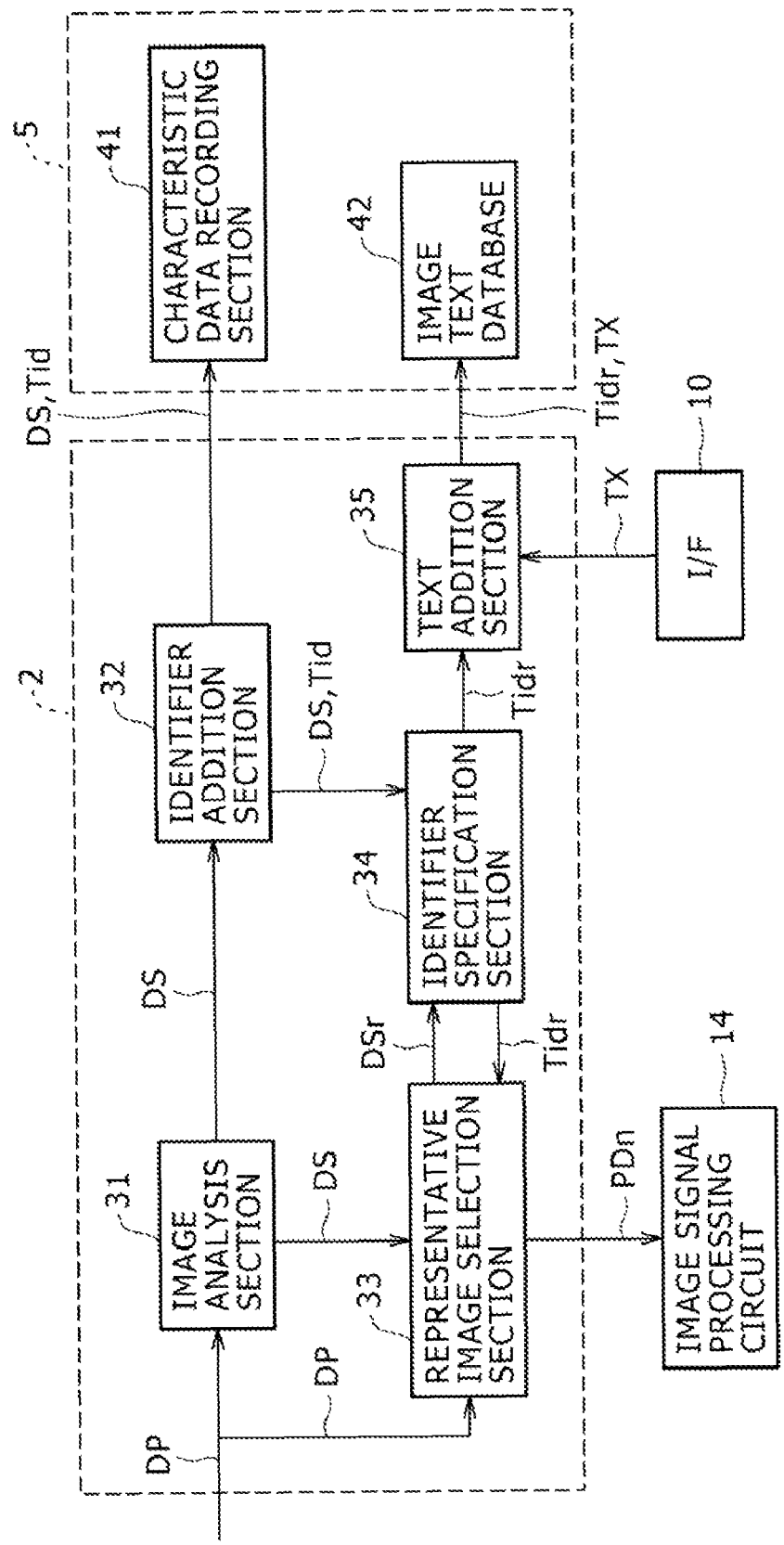
FIG. 2 is a block diagram showing functional blocks for a database production process of the hard disk recorder.

Therefore, the hard disk recorder 1 of the present embodiment is configured so as to produce an image text database 42 in which image text information TX corresponding to characteristic information of an image is recorded. Now, a database production process for producing the image text database 42 is described. In the database production process, the control section 2 of the hard disk recorder 1 executes a database production program to implement such functional blocks as shown in FIG. 2.

The hard disk recorder 1 is configured such that, when it executes the reproduction process of recorded image pickup data recorded, for example, in the hard disk drive (FIG. 1), it executes a database production process concurrently to the reproduction process.

In particular, the control section 2 of the hard disk recorder 1 supplies a reproduction image signal DP decoded by the image decoder 12 to the image signal processing circuit 14 and controls the display apparatus not shown to display an image based on the reproduction image signal DP. Further, the control section 2 controls the image decoder 12 to supply the reproduction image signal DP to an image analysis section 31 and a representative image selection section 33 of the control section 2 as seen in FIG. 2.

The image analysis section 31 extracts reproduction image characteristic data DS as characteristic information which represents characteristics of frame images which form the recorded image pickup data from the reproduction image signal DP. Then, the image analysis section 31 supplies the characteristic information to an identifier application section 32 and the representative image selection section 33.

In particular, when the reproduction image signal DP is received, the image analysis section 31 divides each of frame images included in the reproduction image signal DP, for example, into 25 regions of a matrix of 5 rows and 5 columns. Then, the image analysis section 31 calculates a DCT (Discrete Cosine Transform) coefficient of a luminance signal (Y signal) for each of the regions. Then, the image analysis section 31 represents the DCT coefficients corresponding to the 25 regions as a 25th-order vector and defines the 25th-order vector as the reproduction image characteristic data DS for the individual frame image units.

If, for example, a serial number is applied to the pickup image data ID unique to the pickup image data to produce a characteristic information identifier Tid and the characteristic information identifier Tid is added to the reproduction image characteristic data DS, then the identifier application section 32 supplies the characteristic information identifier Tid and the reproduction image characteristic data DS to a characteristic data recording section 41 of the flash memory 5 so as to be temporarily recorded into the RAM not shown.

When the reproduction image characteristic data DS to which the characteristic information identifier Tid is added is received, the characteristic data recording section 41 records all reproduction image characteristic data DS as accumulated characteristic data DSa in a state that the characteristic information identifier Tid and the reproduction image characteristic data DS are associated with each other.

Meanwhile, the representative image selection section 33 selects representative characteristic data DSr from the reproduction image characteristic data DS supplied thereto from the image analysis section 31 and transmits the selected data DSr to an identifier specification section 34.

In particular, the representative image selection section 33 calculates the distance (hereinafter referred to as preceding-succeeding data distance) as, for example, a vector between two preceding and succeeding reproduction image characteristic data DS and detects a combination of such reproduction characteristic data DS between which the value of the preceding-succeeding data distance is higher than a predetermined scene change threshold value.

At this time, if a combination of reproduction image characteristic data DS between which the preceding-succeeding data distance is higher than the scene change threshold value is detected, then the representative image selection section 33 decides that the frame image on which the succeeding reproduction image characteristic data DS is based exhibits a scene change from the frame image on which the preceding reproduction image characteristic data DS is based. Then, the representative image selection section 33 defines the succeeding reproduction image characteristic data DS as representative characteristic data DSr.

Here, an image content such as pickup image data is generally composed of blocks each including images similar to each other. Therefore, the representative image selection section 33 can determine reproduction image characteristic data DS extracted from each image which represents a block as representative characteristic data DSr by detecting a scene change.

When representative characteristic data DSr is received from the representative image selection section 33, the identifier specification section 34 collates the reproduction image characteristic data DS to which the characteristic information identifier Tid is added and the representative characteristic data DSr with each other. The identifier specification section 34 specifies the characteristic information identifier Tid of the reproduction image characteristic data DS which coincides with the representative characteristic data DSr as a characteristic information identifier Tid (hereinafter referred to as representative characteristic information identifier Tidr) of the representative characteristic data DSr. Then, the identifier specification section 34 signals the representative characteristic information identifier Tidr to a text addition section 35 and the representative image selection section 33.

Then, if the reproduction process of the recorded pickup image data ends, then the representative image selection section 33 specifies reproduction image characteristic data DS (hereinafter referred to as representative image data PDr) utilized as an extraction source of the representative characteristic data DSr using the representative characteristic information identifier Tidr. Then, the representative image selection section 33 superposes the representative image data PDr with the image data read out from the ROM not shown to produce text input image data PDn and signals text input image data PDn to the image signal processing circuit 14.

As a result, the hard disk recorder 1 can control the display apparatus not shown to display a text input screen image 50.

On the text input screen image 50, a representative image 51 based on the representative image data PDr is displayed and, for example, a sentence "Please input words representative of the substance of the image" is displayed. Consequently, the hard disk recorder 1 allows the user to input image text information TX corresponding to the representative image 51 into a text inputting region 52 displayed at a lower portion of the text input screen image 50.

At this time, on the text input screen image 50, a cursor is disposed at a keyboard button 53 at the top from among three buttons displayed at a right portion of the screen image 50. The keyboard button 53 on which the cursor is disposed is displayed in a color different from that of the other buttons.

Figure 4:
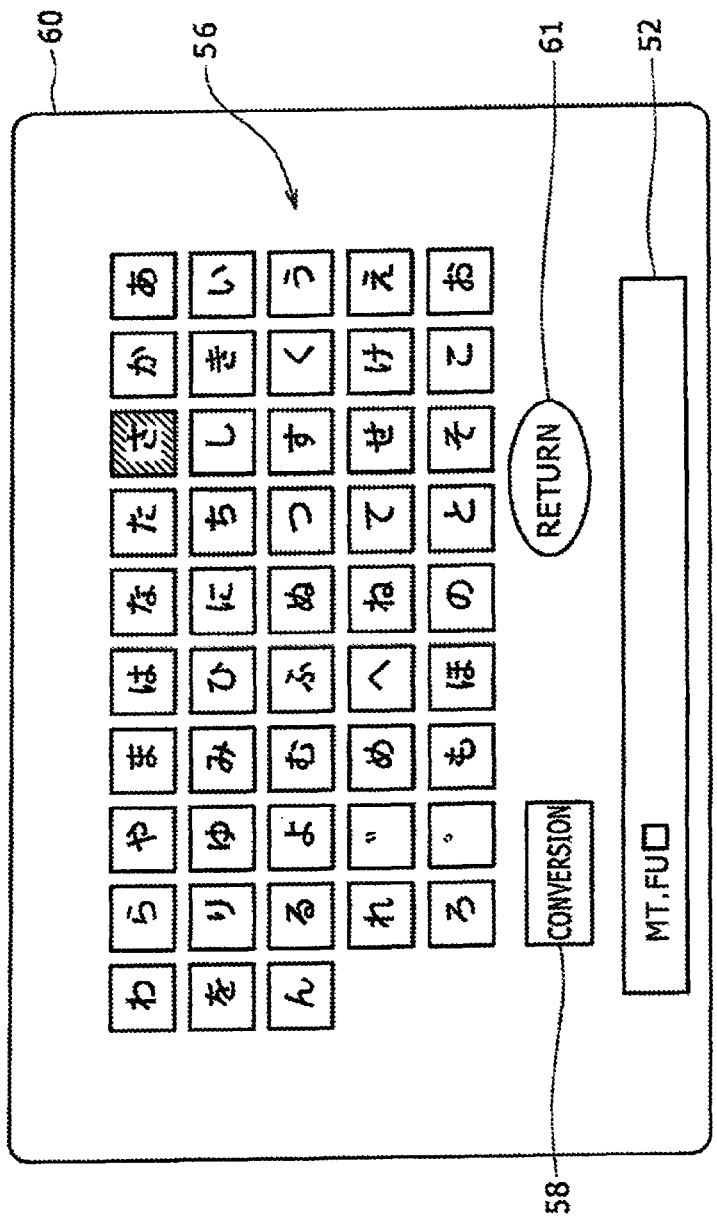
FIG. 4 is a schematic view showing a keyboard screen image.

Here, if a determination button not shown of the remote controller 30 is depressed in a state that the cursor is disposed at the keyboard button 53, then the representative image selection section 33 controls the display apparatus to display a keyboard screen image 60 as seen in FIG. 4 based on the image data read out from the ROM not shown.

On the keyboard screen image 60, the text inputting column 52 is displayed at a lower portion of the screen image 60 similarly as on the text input screen image 50, and the cursor is disposed at one of a return button 61 and keyboard buttons 56 on which hiragana are indicated in a list in the order of the Japanese syllabary.

The representative image selection section 33 (FIG. 2) allows the user to select one of the keyboard buttons 56 using an arrow mark button and the determination button not shown of the remote controller 30 (FIG. 1) such that the user can input image text information TX corresponding to the representative image 51.

Figure 3:
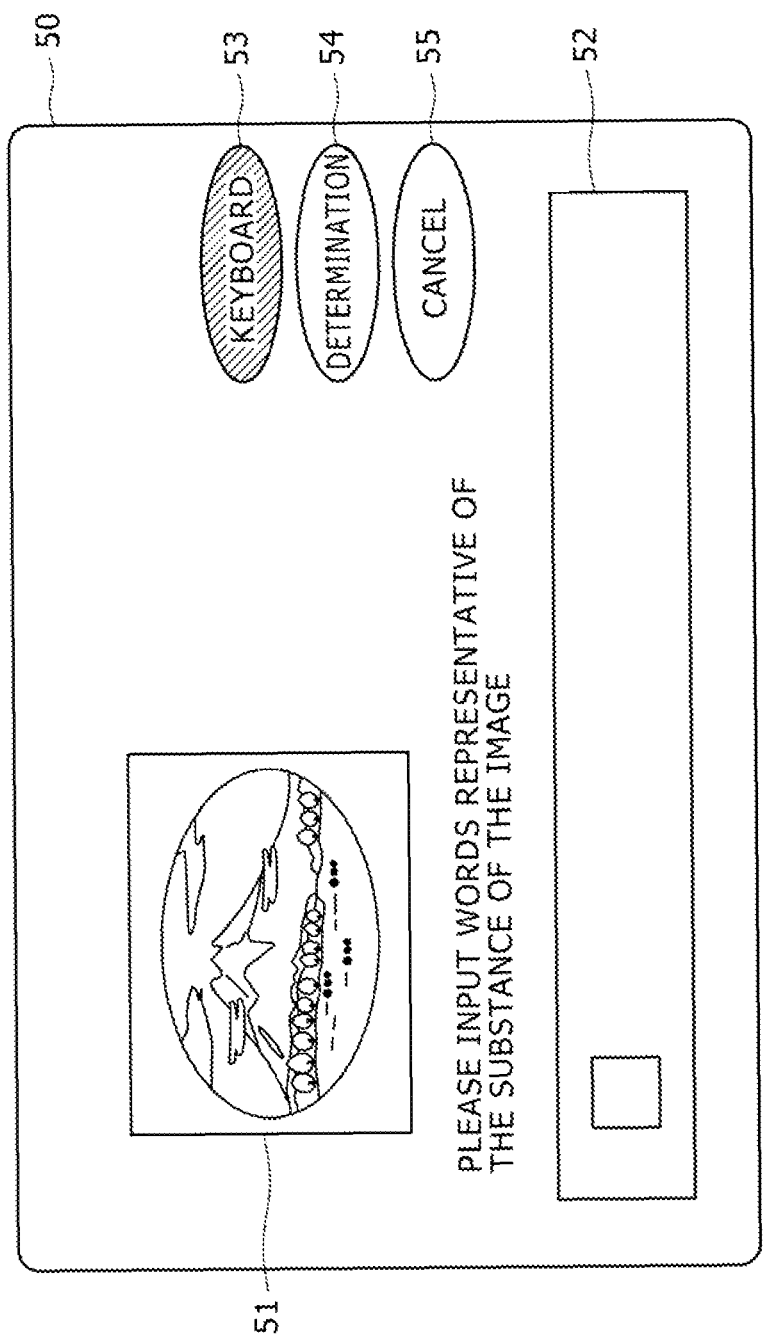
FIG. 3 is a schematic view showing a text inputting screen image.

Further, if the determination button of the remote controller 30 is depressed in a state that the cursor is disposed at the return button 61 of the keyboard screen image 60, then the representative image selection section 33 controls the display apparatus to display the text input screen image 50 (FIG. 3) again.

Then, if an arrow mark button not shown of the remote controller 30 is depressed and an operation signal is supplied from the remote controller interface 10, then the representative image selection section 33 successively moves the cursor, which has been disposed at the keyboard button 53, to the determination button 54 and a stop button 55.

Here, if the determination button not shown of the remote controller 30 (FIG. 1) is depressed in a state that the cursor is disposed at the determination button 54, then the control section 2 (FIG. 2) supplies the inputted image text information TX to the text addition section 35.

The text addition section 35 registers the image text information TX inputted by the user and the representative characteristic information identifier Tidr supplied from the identifier specification section 34 into the image text database 42 (FIG. 2) of the flash memory 5.

Consequently, as seen in FIG. 5, the control section 2 can produce the image text database 42 in which the representative characteristic information identifier Tidr and the image text information TX are registered in an associated relationship with each other. Further, if the image text database 42 is used, then the control section 2 can use characteristic information extracted from any image content by an extraction method similar to the database production process to acquire substance character information corresponding to the image content.

On the other hand, if the determination button not shown of the remote controller 30 is depressed in a state that the cursor is disposed at the stop button 55 (FIG. 3), then the control section 2 stops the database production process.

Consequently, since the hard disk recorder 1 can allow the user to determine, in response to the state of mind of the user, whether or not the database production process is to be executed, it can prevent the user from feeling inputting of image text information TX cumbersome without persistently demanding the user to input image text information TX.

It is to be noted that the representative image selection section 33 can be configured such that it selects reproduction image characteristic data DS corresponding to an image which can be associated readily with text information such as a person or a substance and then selects representative characteristic data DSr from within the data DS. In this instance, the representative image selection section 33 is configured such that a region corresponding to a person or a substance is displayed brighter than the surroundings so as to allow the user to understand the user should input the substance corresponding to the person or the substance and allow the user to accurately input image text information TX which represents the substance of the representative image 51.

In this manner, the hard disk recorder 1 extracts reproduction image characteristic data DS from a reproduction image signal DP and records the extracted data into the characteristic data recording section 41 concurrently with the reproduction process, and selects representative image data DPr each of which represents a scene from the reproduction image characteristic data DS. Then, the hard disk recorder 1 controls the display apparatus to display the representative image 51 based on the representative image data DPr after the reproduction process ends and allow the user to input image text information TX corresponding to the representative image data DPr. Further, the hard disk recorder 1 registers representative characteristic information identifier Tidr corresponding to the representative image data DPr and the image text information TX in an associated relationship with each other.

Consequently, the hard disk recorder 1 can produce the image text database 42 for acquiring the substance character information corresponding to an image.

3. Display of Title Candidates

Figure 6:
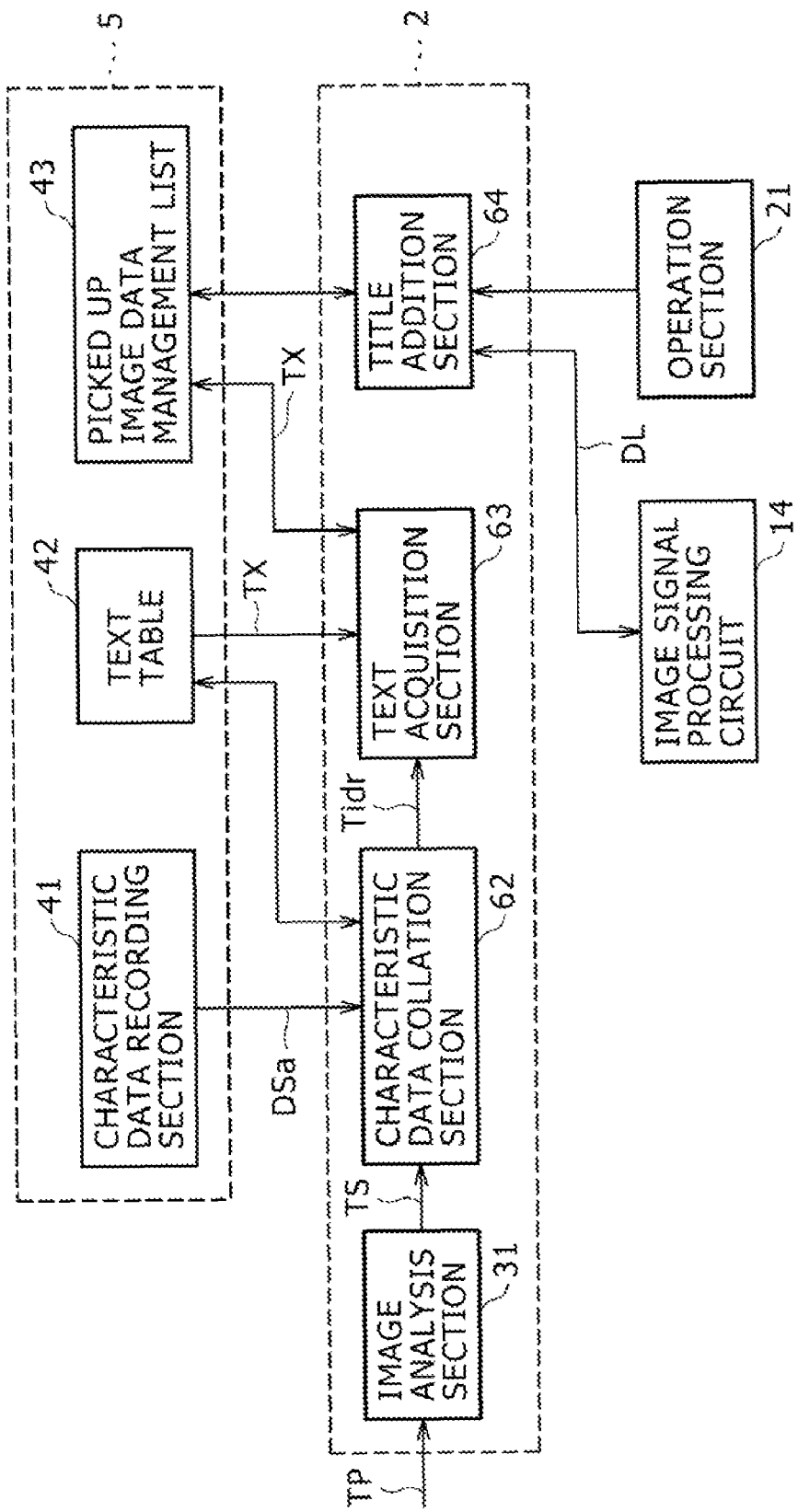
FIG. 6 is a block diagram showing functional blocks for a title candidate acquisition process of the hard disk recorder.

Now, a title candidate display process (title candidate acquisition process and list screen image display process) executed using the image text database 42 described hereinabove is described. In the title candidate display process, the control section 2 of the hard disk recorder 1 executes a title candidate display program to implement functional blocks shown in FIG. 6.

3-1. Acquisition of Title Candidates

When a recording process is performed for input pickup image data inputted from an external apparatus such as a video camera or the like, the control section 2 of the hard disk recorder 1 executes the title candidate acquisition process concurrently with the recording process.

In particular, the control section 2 records input pickup image data inputted through the external interface (FIG. 1) into the hard disk drive 4 (FIG. 1) and supplies an input image signal TP decoded by the image decoder 12 from within the inputted pickup image data to the image analysis section 31.

The image analysis section 31 extracts input image characteristic data TS for each frame image from the input image signal TP by a process similar to that in the database production process and supplies the input image characteristic data TS to a characteristic data collation section 62.

When the input image characteristic data TS is received, the characteristic data collation section 62 selects accumulated characteristic data DSa having the shortest distance to the input image characteristic data TS from within accumulated characteristic data DSa with which the image text information TX is associated.

In particular, the characteristic data collation section 62 collates the accumulated characteristic data DSa recorded in the characteristic data recording section 41 of the flash memory 5 and the input image characteristic data TS with each other to detects, for example, 20 accumulation characteristic data DSa in the ascending order of the distance to the input image characteristic data TS. Then, the characteristic data collation section 62 decides whether or not the detected accumulation characteristic data DSa are registered in the image text database 42.

Here, the characteristic data collation section 62 collates the characteristic information identifier Tid of the detected accumulation characteristic data DSa and the representative characteristic information identifier Tidr of the image text database 42 with each other. Then, if any of the detected accumulation characteristic data DSa is registered in the image text database 42, then the characteristic data collation section 62 selects that of the accumulation characteristic data DSa whose distance to the input image characteristic data TS is smallest as minimum accumulation characteristic data DSan.

Further, characteristic data collation section 62 decides whether or not the distance between the minimum accumulation characteristic data DSan and the input image characteristic data TS is smaller than a predetermined similarity threshold value. Then, if the distance between the minimum accumulation characteristic data DSan and input image characteristic data TS is smaller than the predetermined similarity threshold value, then the characteristic data collation section 62 decides that a frame image based on the input image characteristic data TS and a frame image based on the minimum accumulation characteristic data DSan are similar to each other. Then, the characteristic data collation section 62 signals the representative characteristic information identifier Tidr of the shortest distance accumulation characteristic data DSan to a text acquisition section 63.

When image text information TX corresponding to the representative characteristic information identifier Tidr is acquired from the image text database 42, the text acquisition section 63 temporarily records the image text information TX as substance character information TXc into the RAM not shown. Then, the process for the present input image characteristic data TS is ended and production of next input image characteristic data TS based on the input image signal TP is started. At this time, if the same substance character information TXc is acquired in a plural number of times, then the text acquisition section 63 counts the number of times of acquisition.

Then, after the control section 2 ends the series or processes for acquiring substance character information TXc with regard to all recorded image data TS of the input pickup image data during the recording process, the text acquisition section 63 selects, for example, 10 pieces substance character information TXc in the descending order of the number of times of acquisition from the image text database 42. Then, the text acquisition section 63 registers the selected information into the pickup image data management list 43 as seen in FIG. 7.

Consequently, the control section 2 can select those pieces of substance character information TXc which represent frame images which have a comparatively long period of image pickup time in the input pickup image data and exhibits a comparatively high ratio in the input pickup image data and determine the selected pieces of substance character information TXc as title candidate texts TI. Consequently, those pieces of substance character information TXc which may suggest, with a high degree of probability, that the substance of recorded pickup image data whose recording process is completed can be registered as the title candidate text TI.

On the other hand, when the characteristic information identifier Tid of the detected accumulation characteristic data DSa and the representative characteristic identifier Tidr of the image text database 42 are collated with each other, if none of the detected accumulation characteristic data DSa is registered in the image text database 42, then the characteristic data collation section 62 ends the process for the input image characteristic data TS at present and starts production of input image characteristic data TS based on a next input image signal TP.

Further, if it is decided that the distance between the minimum accumulation characteristic data DSan and the input image characteristic data TS exceeds the predetermined similarity threshold value, then since the frame image based on the input image characteristic data TS and the frame image based on the minimum accumulation characteristic data DSan are not similar to each other, the characteristic data collation section 62 ends the process for the input image characteristic data TS at and starts production of input image characteristic data TS based on a next input image signal TP.

In this manner, in the hard disk recorder 1, when the recording process of pickup image data is performed, input image characteristic data TS is extracted from an input image signal TP and minimum accumulation characteristic data DSan most proximate to the input image characteristic data TS is specified from among the accumulation characteristic data DSa registered in the image text database 42. Further, image text information TX corresponding to the minimum accumulation characteristic data DSan is acquired as substance character information TXc which represents the substance of the frame image utilized as an extraction source of the input image characteristic data TS and the substance character information TXc is registered as title candidate text TI which suggests the substance of the recorded pickup image data.

Consequently, the hard disk recorder 1 can register title candidate texts TI which suggest the substance of the recorded pickup image data into the pickup image data management list 43 without demanding the user to execute any work.

It is to be noted that the hard disk recorder 1 is configured such that, when the recording process of pickup image data is performed, image pickup date and hour information added to the input pickup image data and input information which represents through what one of the input terminals of the external interface 11 the pickup image data has been inputted are automatically registered into the pickup image data management list 43 (FIG. 7).

Further, since the title candidate acquisition process is executed concurrently to the recording process of pickup image data, the hard disk recorder 1 can register substance character information TXc into the pickup image data management list 43 at the substantially same time at which the recording process for the input pickup image data ends.

Accordingly, at the point of time at which the recording process for the input pickup image data ends, the title region Ct into which the title of pickup image data is to be registered and the thumbnail region Cs into which a selected image is to be registered as a thumbnail image are blank and relevant information is registered in the pickup image data ID region Ci, pickup image date and hour information region Cd, title candidate region Ca and input information region Ce are registered.

3-2. Display of a Pickup Image Data Table Screen Image

The control section 2 (FIG. 1) of the hard disk recorder 1 executes a table screen image display process in accordance with a title candidate display program when a recording process of image data is completed with regard to all of designated pickup image data or when an operation signal representative of a request to display a pickup image data table screen image 70 is received from the remote controller interface 10 in response to an operation of the remote controller 30 by the user.

Figure 8A:
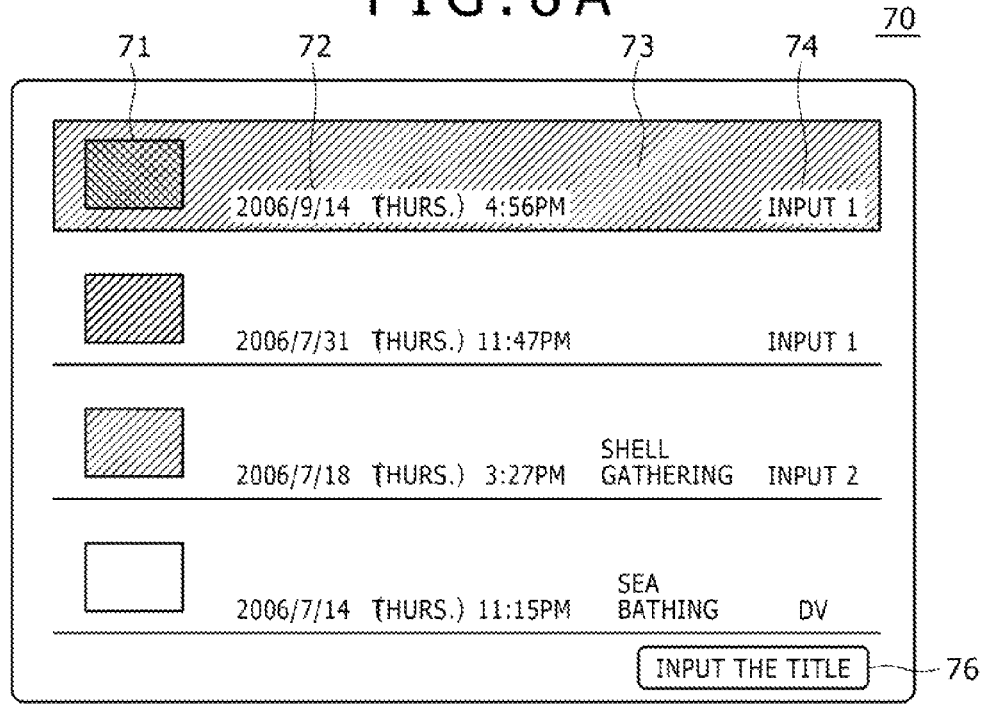
FIGS. 8A and 8B are schematic views showing display screen images of title candidate text.
Figure 8B:
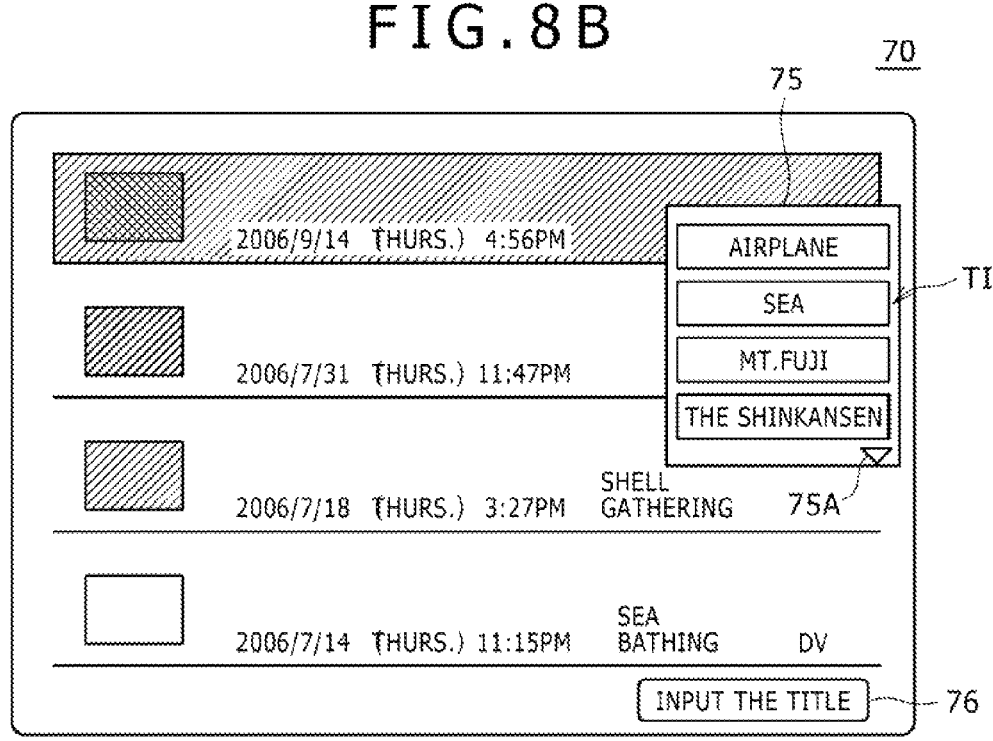

In particular, the title addition section 64 (FIG. 6) of the control section 2 produces table image data DL based on the pickup image data management list 43 and signals the produced table image data DL to the image signal processing circuit 14 so that the pickup image data table screen image 70 is displayed on the display apparatus (not shown) as seen in FIG. 8A or 8B.

Referring to FIG. 8A, on the pickup image data table screen image 70, image pickup date and hour information and input information are displayed in an image pickup data and hour information display region 72 and an input information display region 73 based on the pickup image data management list 43, respectively.

If some title is registered in the pickup image data management list 43 (FIG. 7), then the title of the recorded pickup image data is displayed in an input information display region 73. However, if no title is registered, then the input information display region 73 remains blank and displays nothing.

In FIG. 8A, the title addition section 64 causes the recorded pickup image data at the highest stage of the pickup image data table screen image 70 to be displayed in a color different from the color of the surroundings as the cursor is positioned at the recorded pickup image data at the highest stage. Then, if an arrow mark button (not shown) of the remote controller 30 (FIG. 1) is depressed by the user and an operation signal is issued from the remote controller interface 10 in response to the depression, then the title addition section 64 successively shifts the cursor to the recorded pickup image data at the directly lower stage.

Then, if the determination button not shown of the remote controller 30 (FIG. 1) is depressed while the cursor is disposed at one of the stages of recorded pickup image data, then the title addition section 64 (FIG. 6) causes the title candidate text TI regarding the recorded pickup image data designated by the cursor to be displayed as a sub screen 75 by the pull-down method and disposes the cursor at one of the title candidate texts TI.

Further, the title addition section 64 displays the title candidate texts TI from above on the sub screen 75 in the descending order of the number of times by which the title candidate text TI is acquired from the image text database 42 during the title candidate acquisition process.

Consequently, the hard disk recorder 1 displays the title candidate texts TI in the descending order of the number of times by which the title candidate text TI is acquired as substance character information TXc corresponding to the substance of frame images of the recorded pickup image data, that is, in the order corresponding to the descending order of the number of times among images of the recorded pickup image data. Therefore, the hard disk recorder 1 can present those title candidate texts TI which may suggest the substance of recorded pickup image data with a comparatively high probability to the user. Consequently, the hard disk recorder 1 can cause the display apparatus to display text information which suggests the substance of recorded pickup image data without reproducing the recorded pickup image data intentionally.

It is to be noted that the mark ∇ displayed at a right lower portion of the sub screen 75 represents that a different title candidate text or texts TI exist below the sub screen 75. Thus, if a downwardly directed arrow mark button of the remote controller 30 is depressed, then the title addition section 64 scrolls the sub screen 75 so that a title candidate or candidates existing below the sub screen 75 are displayed.

Further, if the determination button of the remote controller 30 is depressed in a state that the cursor is disposed at a title candidate, that example, at "Mt. Fuji", then the title addition section 64 causes the title "Mt. Fuji" to be displayed in the title region Ct of the pickup image data management list 43 and causes the title "Mt. Fuji" to be displayed in the input information display region 73 of the pickup image data table screen image 70.

Consequently, the hard disk recorder 1 can allow the user to determine a title by a simple and easy operation of selecting a title candidate from among a plurality of title candidates. Therefore, the hard disk recorder 1 can allow a title to be registered into the image text database 42 by a simple operation without demanding the user to manually input a title.

Incidentally, if "Mt. Fuji" is selected as the title, then the title addition section 64 selects, from among the recorded pickup image data which are currently displayed and have a representative image 51, an image corresponding to "Mt. Fuji" and causes the image to be displayed in the thumbnail image display region 71.

If it is decided based on the recorded pickup image data currently displayed that a representative characteristic information identifier Tidr registered in an associated relationship with "Mt. Fuji" exist, then the title addition section 64 selects one of the displayed representative characteristic information identifiers Tidr from within the image text database 42 and registers the selected representative characteristic information identifier Tidr into the thumbnail region Cs of the pickup image data management list 43. Further, the title addition section 64 causes an image corresponding to the representative characteristic information identifier Tidr to be displayed as a thumbnail image in the thumbnail image display region 71.

On the other hand, if it is decided based on the recorded pickup image data currently displayed that no representative characteristic information identifier Tidr is registered in an associated relationship with "Mt. Fuji", then the title addition section 64 selects one of the representative characteristic information identifiers Tidr associated with "Mt. Fuji" based on the other recorded pickup image data. Then, the title addition section 64 detects input characteristic extraction data TS most similar to the accumulation characteristic data DSa represented by the representative characteristic information identifier Tidr, specifies a characteristic information identifier Tid of the detected input characteristic extraction data TS and registers the specified characteristic information identifier Tid into the thumbnail region Cs of the pickup image data management list 43. Further, the title addition section 64 causes an image corresponding to the representative characteristic information identifier Tidr to be displayed as a thumbnail image in the thumbnail image display region 71.

Further, if no title is set in the pickup image data management list 43 and no representative characteristic information identifier Tidr is registered in the thumbnail region Cs, then the title addition section 64 causes an arbitrary image such as an image of the first frame of the registered pickup image data to be displayed in the thumbnail image display region 71.

Consequently, since the title addition section 64 can cause representative image data PDr corresponding to the title selected by the user as representing the substance of the pickup image data to be displayed as a thumbnail image, an image representative of the substance of the pickup image data can be displayed in the thumbnail image display region 71.

Further, if the determined button of the remote controller 30 is depressed while the cursor is disposed at a title input button 76, then the title addition section 64 causes the keyboard screen image 60 (FIG. 4) to be displayed so that the user can input an arbitrary title.

Consequently, the title addition section 64 can allow the user to refer to the displayed title candidate texts TI and input a free title in accordance with the liking of the user. Further, even if the displayed title candidate text TI is not favorable to the user, the title addition section 64 can allow the user to set a title favorable to the user to recorded pickup image data.

In this manner, when the hard disk recorder 1 displays a pickup image data table screen image, it causes title candidate texts TI registered in the title candidate acquisition process to be displayed on the sub screen 75 so that the user can select a title for pickup image data from among the title candidate texts TI.

Consequently, the hard disk recorder 1 allows the user to determine a title for recorded pickup image data by a simple and easy operation of selecting one of the displayed title candidate texts TI. As a result, the user can perform an inputting operation of a title into the image text database 42 simply and readily.

4. Image Text Database Production Processing Procedure

Figure 9:
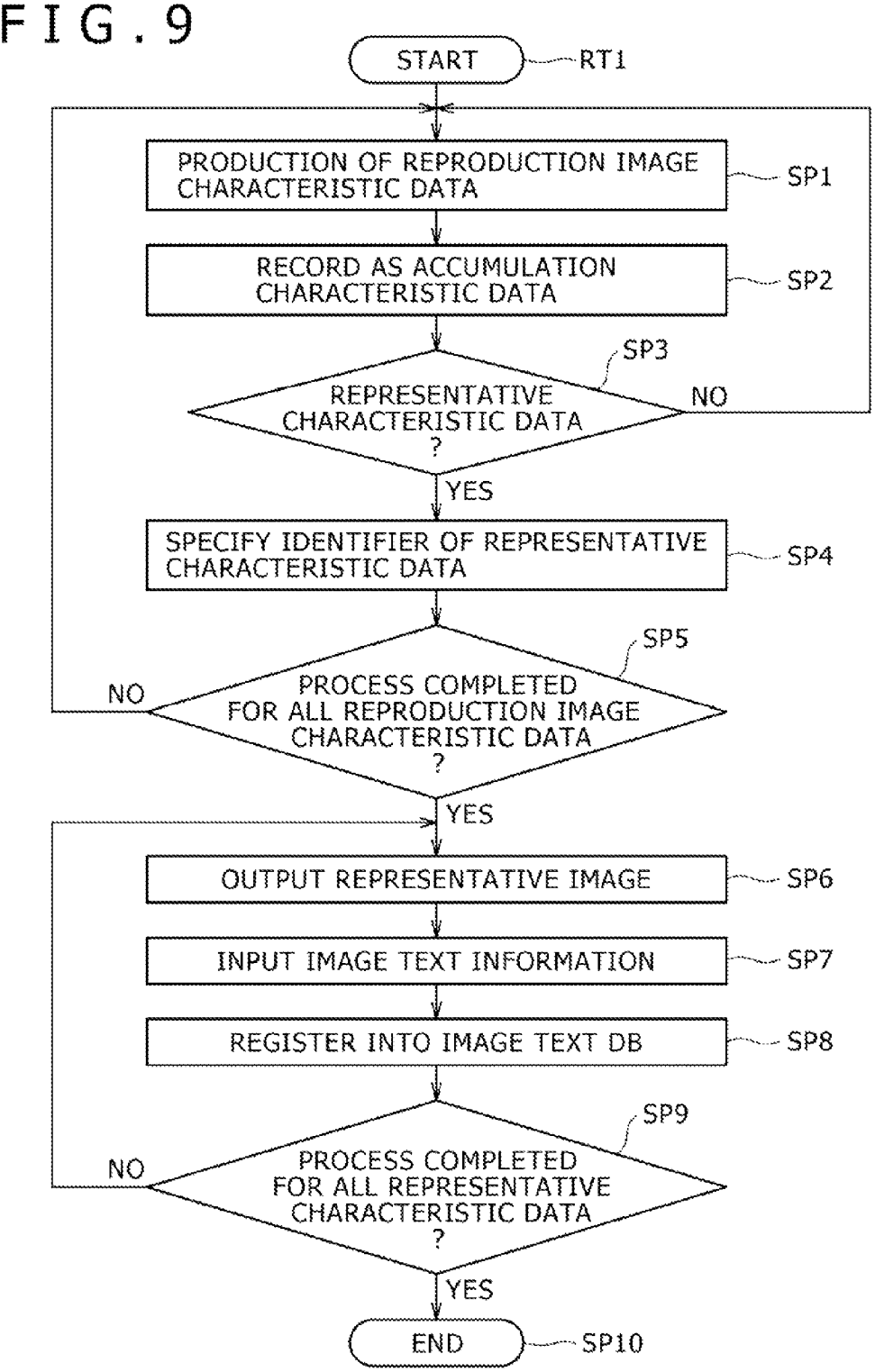
FIG. 9 is a flow chart illustrating an image text database production process of the hard disk recorder.

Now, a database processing procedure executed in accordance with the database production program is described with reference to a flow chart of FIG. 9.

The control section 2 of the hard disk recorder 1 starts a reproduction process for recorded pickup image data recorded in the hard disk drive 4 in response to an operation of the remote controller 30 (FIG. 1) by the user. After the reproduction process is entered, the control section 2 enters the database processing procedure RT1 from a starting step and advances the processing thereof to step SP1. At step SP1, the control section 2 produces reproduction image characteristic data DS based on a reproduction image signal DP supplied thereto from the image data 12. Then, the processing advances to step SP2.

At step SP2, the control section 2 adds a characteristic information identifier Tid to the reproduction image characteristic data DS and records the characteristic information identifier Tid into the characteristic data recording section 41 (FIG. 2) of the flash memory 5. Thereafter, the processing advances to step SP3.

At step SP3, the control section 2 decides, for example, whether or not the reproduction image characteristic data DS supplied thereto include a scene change thereby to decide whether or not the reproduction image characteristic data DS are representative characteristic data DSr. If a negative result is obtained, then the control section 2 returns the processing to step SP1 to start processing for next reproduction image characteristic data DS.

On the other hand, if an affirmative result is obtained at step SP3, then the control section 2 advances the processing to step SP4. At step SP4, the control section 2 specifies the representative characteristic information identifier Tidr of the representative characteristic data DSr and temporarily stores the representative characteristic information identifier Tidr into the RAM not shown. Thereafter, the processing advances to step SP5.

At step SP5, the control section 2 decides whether or not the process is completed for all reproduction image signals DP of the reproduced recorded pickup image data. If a negative result is obtained, then the control section 2 returns the processing to step SP1 to start a process for next reproduction image signal DP.

On the other hand, if an affirmative result is obtained at step SP5, then this signifies that the reproduction process for the recorded pickup image data is completed. In this instance, the control section 2 advances the processing to step SP6.

At step SP6, the control section 2 uses the representative characteristic information identifier Tidr recorded in the RAM to specify the representative image data DPr and causes the display apparatus (not shown) to display the text input screen image 50 (FIG. 3) including a representative image 51 based on the representative image data DPr. Thereafter, the processing advances to step SP7.

At step SP7, the control section 2 until image text information TX is inputted by the user. If image text information TX is inputted, then the processing advances to step SP8.

At step SP8, the control section 2 registers the image text information TX inputted at step SP7 and the representative characteristic information identifier Tidr in an associated relationship with each other into the image text database 42 (FIG. 5). Thereafter, the processing advances to step SP9.

At step SP9, the control section 2 decides whether or not the process for all representative characteristic data DSr recorded in the RAM is completed. If a negative result is obtained, then the control section 2 returns the processing to step SP6 to start a process for next representative characteristic data DSr.

On the other hand, if an affirmative result is obtained at step SP9, then the control section 2 advances the processing to step SP10, at which it ends the processing.

It is to be noted that the control section 2 repeats the database production process once for recorded pickup image data. Where a reproduction process of pickup image data is executed by a plural number of times for the same recorded pickup image data, the database production process is not executed in the second or later reproduction process for the pickup image data.

Further, if an operation signal representative of an inputting request to input image text information TX corresponding, for example, to an image currently being displayed in response to an operation of the user while the reproduction process of recorded pickup image data is being performed for a plural numbered time, then the control section 2 determines the currently displayed screen image as a representative image and executes the processes at steps SP6 to SP10.

In this instance, the control section 2 need not extract reproduction image characteristic data from the image data currently being displayed, but may specify, at step SP8, a characteristic information identifier Tid corresponding to the currently displayed image data and determine the characteristic information identifier Tid as a representative characteristic information identifier Tidr.

5. Title Candidate Display Processing Procedure

Figure 10:
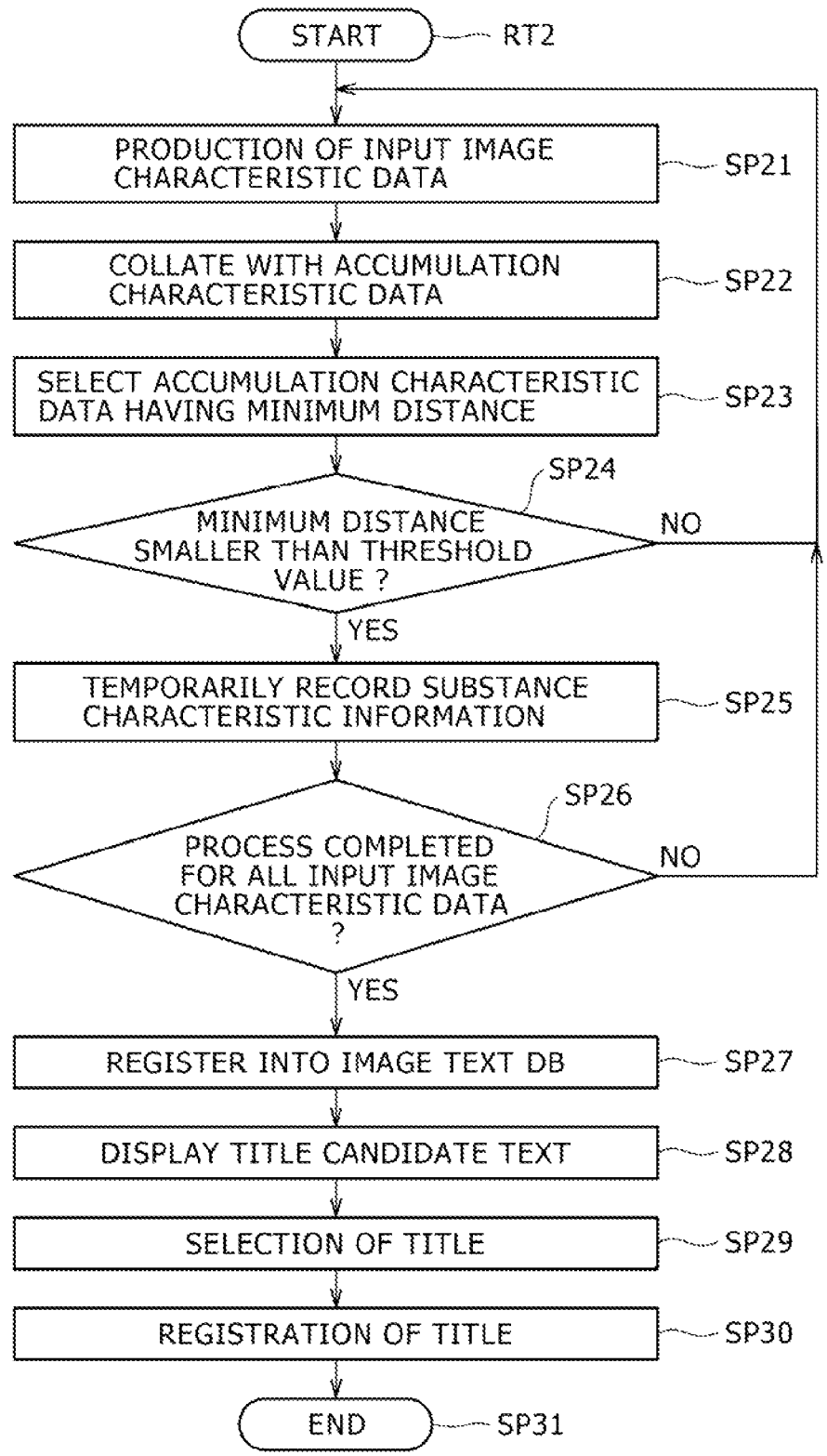
FIG. 10 is a flow chart illustrating a title candidate display process of the hard disk recorder.

Now, a title candidate display processing procedure which is executed in accordance with the database production program is described with reference to a flow chart of FIG. 10.

The control section 2 of the hard disk recorder 1 starts a recording process for input pickup image data inputted from the external apparatus (not shown) such as a video camera connected to the external interface 11 in response to an operation of the remote controller 30 (FIG. 1) by the user. After the recording process is entered, the control section 2 enters a title candidate processing procedure RT2 through a starting step and advances the processing to step SP21. At step SP21, the control section 2 produces input characteristic extraction data TS based on an image signal TP supplied thereto from the image data 12. Then, the processing advances to step SP22.

At step SP22, the control section 2 collates the input characteristic extraction data TS produced at step SP21 with the accumulation characteristic data DSa recorded in the characteristic data recording section 41 (FIG. 6) of the flash memory 5. Then, the processing advances to step SP23, at which the control section 2 selects, from among the accumulation characteristic data DSa, minimum accumulation characteristic data DSan registered in the image text database 42 and having the smallest distance to the input characteristic extraction data TS. Then, the processing advances to step SP24.

At step SP24, the control section 2 decides whether or not the smallest distance is smaller than a predetermined similarity threshold value.

If a negative result is obtained, then this represents that the minimum accumulation characteristic data DSan having the smallest distance and the input characteristic extraction data TS are not similar to each other. In this instance, the control section 2 returns the processing to step SP21 to start a process for next reproduction image signal DP.

On the other hand, if an affirmative result is obtained at step SP24, then this represents that the minimum accumulation characteristic data DSan and the input characteristic extraction data TS are similar to each other. In this instance, the control section 2 advances the processing to step SP25.

At step SP25, the control section 2 acquires substance character information TXc corresponding to the minimum accumulation characteristic data DSan from the image text database 42 and temporarily stores the substance character information TXc as substance character information TXc corresponding to the input image signal TP into the RAM not shown. Thereafter, the processing advances to step SP26.

At step SP26, the control section 2 decides whether or not the process for all recorded image characteristic data TP in the input pickup image data under the recording processing is completed. If a negative result is obtained, then the control section 2 returns the processing to step SP21 to start a process for a next image signal TP.

On the other hand, if an affirmative result is obtained at step SP26, then this signifies that the recording process for all of the input image data is completed. In this instance, the control section 2 advances the processing to step SP27.

At step SP27, the control section 2 confirms the number of times of acquisition of the substance character information TXc and selects, for example, 10 pieces of the substance character information TXc in the descending order of the number of times of acquisition as title candidate texts TI. Then, the control section 2 registers the selected title candidate texts TI into the pickup image data management list 43 (FIG. 7), whereafter the processing advances to step SP28.

At step SP28, the control section 2 causes the display apparatus not shown to display an pickup image data table screen image 70 (FIG. 8), which is a table of recorded pickup image data, based on the pickup image data management list 43. Then, the processing advances to step SP29. In this instance, the control section 2 controls the display apparatus to display the title candidate texts TI in a sub screen 75A (refer to FIG. 8B) in response to an operation of the user.

At step SP29, the control section 2 waits that a title for the recorded pickup image data is selected by the user. After a title is selected by the user, the processing advances to step SP30.

At step SP30, the control section 2 registers the title selected at step SP29 into the image text database 42 (FIG. 7). Thereafter, the processing advances to step SP31, at which the control section 2 ends the process.

It is to be noted that, if an operation signal representing a request to display the pickup image data table screen image 70 (FIG. 8) in response to an operation of the remote controller 30 by the user while the recording process for input pickup image data is not being executed, then the control section 2 executes the table screen image display process at steps SP28 to SP31. Further, in the recording process for input pickup image data, the control section 2 may execute the title candidate acquisition process at steps SP21 to SP27 and then advance the processing directly to step SP31 while eliminating the table screen image display process.

6. Operation and Effects

The hard disk recorder 1 having the configuration described above selects some image data from among pickup image data of an image content as representative image data DPr which represent the pickup image data and displays representative images 51 based on the representative image data DPr on the display apparatus so that the user may input image text information TX corresponding to the representative images 51. Further, the hard disk recorder 1 registers representative characteristic data DSr extracted from the representative image data PDr in accordance with a predetermined extraction method which uses the luminance and the image text information TX in an associated relationship with each other to automatically produce an image text database 42 for allowing acquisition of substance character information TXc corresponding to an image of recorded pickup image data using input image characteristic data TS extracted in accordance with a method same as that used for the representative characteristic data DSr from an arbitrary image content such as recorded pickup image data.

As a result, since the hard disk recorder 1 can acquire the substance character information TXc using the input image characteristic data TS from the image text database 42, text information corresponding to the image of the pickup image data, that is, text information which suggests the substance of the pickup image data, can be registered automatically as a title candidate text TI into the pickup image data management list 43.

At this time, the hard disk recorder 1 selects, for each scene, a representative image 51 suitable for establishing association with the image text information TX from within the pickup image data and allows the user to input image text information TX with regard to the representative image 51. Consequently, if the user executes a simple operation of inputting image text information TX corresponding to the representative image 51 with reference to the representative image 51 displayed on the display apparatus, the image text database 42 can be produced readily.

Further, as the hard disk recorder 1 executes a database production process concurrently to the pickup image data reproduction process, it can display a representative image 51 immediately after the pickup image data reproduction process is completed. Thus, different from a case that, for example, execution of a representative image is executed in accordance with a request of the user, the user need not wait over the processing time (steps SP1 to SP5) for selection of a representative image.

Further, since the hard disk recorder 1 displays a representative image 51 after completion of the pickup image data reproduction process, the representative image 51 can allow the user to input image text information TX while allowing the user to enjoy an aftereffect of pickup image data immediately after the user enjoys the pickup image data. Consequently, the hard disk recorder 1 can prevent the user from feeling a stress by the inputting operation of image text information TX.

Further, the hard disk recorder 1 can allow the user after the reproduction process of pickup image data to visually confirm the representative images 51 while the user remembers the substance of the pickup image data. Consequently, the hard disk recorder 1 can allow the user to input appropriate image text information TX corresponding to the representative images 51 by a simple operation without reminding the user of the substance of the representative images 51.

Further, the hard disk recorder 1 selects a representative image 51 using reproduction image characteristic data DS produced in accordance with an extraction method same as that used for extraction of representative characteristic data DSr from pickup image data. Consequently, different from a method that, for example, sound data are used to extract a representative image 51, the number of times of a process for extracting reproduction image characteristic data DS from pickup image data can be restricted to once, and therefore, the processing load to the control section 2 can be reduced.

Furthermore, the hard disk recorder 1 records all reproduction image characteristic data DS produced from pickup image data into the characteristic data recording section 41. Consequently, also when image text information TX corresponding to currently displayed images is registered into the image text database 42 in accordance with a request of the user, there is no necessity to extract image characteristic data DS again from among the images being currently displayed. Also it is possible to utilize the reproduction image characteristic data DS to execute various processes such as, for example, digest reproduction.

Further, since the hard disk recorder 1 which executes a recording process and a reproduction process of pickup image data produces an image text database 42, the hard disk recorder 1 allows the liking or the tendency of images to be reflected on the image text database 42 for each user. Consequently, the hard disk recorder 1 allows each user to use the image text database 42 to acquire text information which precisely suggests the substance of pickup image data from among images of the pickup image data.

The hard disk recorder 1 having the configuration described above controls representative images 51 selected from within pickup image data to be displayed and causes the user to input image text information TX corresponding to one of the representative images 51 while it produces an image text database 42 in which the image text information TX and representative characteristic data DSr corresponding to the representative images 51 are registered in an associated relationship with each other. Consequently, the hard disk recorder 1 can use the image text database 42 to acquire substance character information TXc corresponding to an image. Therefore, even if the hard disk recorder 1 does not cause the user to input the substance of pickup image data, it can acquire substance character information corresponding to an image of an image content as text information which suggests the substance of the pickup image data from the images of the pickup image data. Thus, a database production method, a database production program, a database production apparatus and an image content recording apparatus by which a database of substance character information to be associated with the image content can be produced readily can be implemented.

7. Modifications

While, in the embodiment described above, all images corresponding to representative characteristic data DSr selected by the representative image selection section 33 are displayed as representative images 51 on the display apparatus, according to the embodiment of the present invention, the displaying manner of images is not limited to this, but, for example, those images which are not similar to representative images 51 which have been displayed in the past may be displayed as representative images 51.

In this instance, the hard disk recorder 1 collates the selected representative characteristic data DSr and the accumulation characteristic data DSa with each other and displays those representative characteristic data DSr whose distance to all accumulation characteristic data DSa registered in the image text database 42 is greater than a predetermined display threshold value as representative images 51 on the display apparatus. The display threshold value may be set to a value equal to or different from the similarity threshold value.

Consequently, such an image with regard to which same image text information TX is expected to be inputted because the image data is proximate to some accumulation characteristic data DSa registered in the image text database 42 can be prevented from being displayed. As a result, the hard disk recorder 1 can prevent such a situation that the user inputs the same word repetitively, and consequently can prevent the user from feeling a stress with regard to the inputting operation to the utmost.

Further, while, in the embodiment described above, the database production process is executed concurrently upon a reproduction process of pickup image data, according to the embodiment of the present invention, execution of the data production process is not limited to this, but the data production process may otherwise be executed, for example, by itself or concurrently upon a recording process.

Where the database production process is executed concurrently with a recording process, while the hard disk recorder 1 executes, for example, the title candidate acquisition process (FIG. 6), it adds a characteristic information identifier Tid to input characteristic data TS extracted by the image analysis section 31 by means of the identifier addition section 32 and then records the characteristic data TS with the characteristic information identifier Tid as it is into the characteristic data recording section 41. Simultaneously, the hard disk recorder 1 selects representative characteristic data DSr by means of the representative image selection section 33 and records the representative characteristic information identifier Tidr specified by the identifier specification section 34 into the flash memory 5 or the hard disk drive 4.

Consequently, by a simple process of selecting corresponding representative image data PDr from representative images 51 in accordance with a request of the user and causing the display apparatus to display the representative image 51 based on the representative image data PDr, the hard disk recorder 1 can display, also from, for example, pickup image data whose reproduction process has not been performed as yet, a representative image 51 quickly at any time on the display apparatus so that the user can input image text information TX.

Further, where more than a predetermined number of pieces of image text information TX are registered in the image text database 42, the database production process may be omitted or the database production process may be executed in response to a request of the user.

Further, while, in the embodiment described hereinabove, the hard disk recorder 1 causes the user to input image text information TX with regard to all of representative images 51 displayed, according to the embodiment of the present invention, inputting of image text information TX is not limited to this. For example, a skip button may be provided on the text input screen image 50 such that, if the determination button of the remote controller 30 is depressed in a state that the cursor is disposed at the skip button, then the processing regarding the representative image 51 being currently displayed is stopped and next representative images 51 are displayed.

Consequently, if a representative image 51 displayed is difficult to be ready for image text information TX, that is, is difficult to be represented in characters readily, the user can select not to add image text information TX to this representative image 51. Consequently, image text information TX which is not suitable for the image text database 42 can be prevented from being registered into the image text database 42, and it is possible to prevent the user from feeling a burden in thinking about image text information TX corresponding to representative images 51.

Furthermore, while, in the embodiment described hereinabove, all characteristic data TS are recorded into the characteristic data recording section 41, according to the embodiment of the present invention, recording of such reproduction image characteristic data DS is not limited to this, but it is necessary at least for representative characteristic data DSr to be recorded. Also in this instance, similar effects to those described hereinabove can be anticipated.

Further, while, in the embodiment described hereinabove, reproduction image characteristic data DS are supplied from the image analysis section 31 to the representative image selection section 33, according to the embodiment of the present invention, supply of such reproduction image characteristic data DS is not limited to this, but, for example, reproduction image characteristic data DS to which a characteristic information identifier Tid is added may be supplied from the identifier addition section 32 to the representative image selection section 33. Thus, the necessity for the process of specifying a representative characteristic information identifier Tidr corresponding to the representative characteristic data DSr by the identifier specification section 34 is eliminated, and the processing load to the control section 2 can be moderated.

Furthermore, in the embodiment described hereinabove, when the hard disk recorder 1 allows the user to input image text information TX for a currently displayed image in accordance with a request of the user, accumulation characteristic data DSa recorded in the characteristic data recording section 41 are used. According to the embodiment of the present invention, however, use of the accumulation characteristic data DSa is not limited to this, but the accumulation characteristic data DSa may be used in various processes such as, for example, selection of a reproduction portion upon digest reproduction.

Further, in the embodiment described hereinabove, a characteristic information identifier Tid formed from image pickup data ID and a sequential number is added to reproduction image characteristic data DS. According to the embodiment of the present invention, however, addition of the characteristic information identifier Tid is not limited to this, but any addition method of the characteristic information identifier Tid may be used if recorded pickup image data and the characteristic information identifier Tid are associated with each other.

Further, while, in the embodiment described hereinabove, reproduction image characteristic data DS are produced for each frame image from pickup image data, according to the embodiment of the present invention, production of the reproduction image characteristic data DS is not limited to this, but the reproduction image characteristic data DS may be produced, for example, for each field image.

Further, while, in the embodiment described hereinabove, reproduction image characteristic data DS are produced from all frame images of pickup image data, according to the embodiment of the present invention, production of the reproduction image characteristic data DS is not limited to this, but the reproduction image characteristic data DS may be produced, for example, for every several frames.

Further, while, in the embodiment described hereinabove, reproduction image characteristic data DS are extracted in order to select a representative image 51, according to the embodiment of the present invention, selection of a representative image 51 is not limited to this, but various selection methods may be used. For example, a representative image 51 may be selected after every predetermined interval of time after a reproduction process is started.

Further, in the embodiment described hereinabove, the luminance (Y) of each frame image is used to produce input image characteristic data TS from recorded image data TP using a DC coefficient. However, according to the embodiment of the present invention, production of the input image characteristic data TS is not limited to this, but the color (Cr, Cb) of an image, sound data or the like may be used to produce input image characteristic data TS, or such data and information as mentioned may be suitably combined to produce input image characteristic data TS.

Also it is possible to produce input image characteristic data TS from average values of the DC component for the individual blocks composed of 8×8 pixels or to extract person recognition characteristics or object identification characteristics which represent a contour of a person or a substance from recorded image data TP using such a method as, for example, a fractal contour extraction method and determine the extracted characteristics as input image characteristic data TS.

Further, while, in the embodiment described hereinabove, a scene change is detected for selection of a representative image 51, according to the embodiment of the present invention, the object of detection is not limited to this. For example, characteristic data DS higher than a predetermined threshold value may be detected based on a histogram produced from characteristic data DS based on sound data such that an image corresponding to the detected characteristic data DS is determined as a representative image 51. Reproduction image characteristic data DS from which a characteristic which can be readily associated with text information such as the frequency of a scene change or a similar image detected using reduced screen image data, the duration of a similar image, or human body recognition characteristics or object recognition characteristics may be determined as representative characteristic data DSr.

Further, while, in the embodiment described hereinabove, reproduction image characteristic data DS are extracted for each image and a still image is selected as a representative image 51, according to the embodiment of the present invention, selection of a representative image 51 is not limited to this. For example, a motion vector within a unit of a predetermined period of time may be extracted as reproduction image characteristic data DS such that a moving picture is selected as a representative image 51. In this instance, the control section 2 registers a representative characteristic information identifier Tidr representative of a moving picture into the image text database 42.

Further, in the embodiment described hereinabove, the hard disk recorder 1 which records and reproduces an image content such as pickup image data executes the database production process. However, according to the embodiment of the present invention, execution of the database production process is not limited to this, but various information processing apparatus such as, for example, a personal computer, a video camera or a server connected to a network may execute the database production process.

Further, in the embodiment described hereinabove, the hard disk recorder 1 uses the image text database 42 to acquire substance character information TXc corresponding to an image of an image content such as pickup image data. However, according to the embodiment of the present invention, acquisition of substance character information TXc is not limited to this, but the image text database 42 may be used to acquire substance character information TXc corresponding to various image contents such as a still picture.

Further, while, in the embodiment described hereinabove, the image text database 42 is recorded into the flash memory 5 of the hard disk recorder 1, according to the embodiment of the present invention, recording of the image text database 42 is not limited to this, but the image text database 42 may be recorded into the hard disk drive 4. Furthermore, the hard disk recorder 1 need not necessarily have the image text database 42, but may share the image text database 42, for example, through a network.

In this instance, the image text database 42 and the representative characteristic data DSr registered in the image text database 42 are recorded into the server, and each hard disk recorder accesses the server through the network. Consequently, when compared with an alternative case that the hard disk recorder 1 produces the image text database 42, it is possible to register image text information TX corresponding to a greater number of representative images 51 such that, in the title candidate acquisition process, substance character information TXc corresponding to more proximate images can be acquired and the load of inputting image text information TX of users can be reduced.

Further, while, in the embodiment described hereinabove, the hard disk recorder 1 having recording and reproduction functions executes the database production process, according to the embodiment of the present invention, execution of the database production process is not limited to this. In particular, similar effects to those of the embodiment described above can be anticipated also where a computer having recording and reproduction functions of an image content, a recording apparatus having a recording function, or a recording and reproduction apparatus having a recording and function and a reproduction function executes the database production process.

Further, while, in the embodiment described hereinabove, a television broadcasting program distributed automatically or pickup image data inputted through the external interface 11 is recorded, according to the embodiment of the present invention, an object of recording is not limited to this, but an image content, for example, downloaded through the Internet may be recorded.

Further, while, in the embodiment described hereinabove, the database production program and so forth are stored in advance in the ROM or the hard disk drive 4, according to the embodiment of the present invention, the source of the database program and so forth is not limited to this. In particular, the database program and so forth may be installed from an external storage medium such as a memory stick (registered trademark of Sony Corporation) into the flash memory 5 or the like. Further, the database production program and so forth may be acquired from the outside through a USB (Universal Serial Bus), an Ethernet (trademark), or a radio LAN (Local Area Network) such as (Institute of Electrical and Electronics Engineers) 802.11a/b/g or distributed by a ground digital television broadcast or a BS television broadcast.

Further, in the embodiment described hereinabove, the hard disk recorder 1 as a database production apparatus is formed from the representative image selection section 33 serving as a representative image selection section and a display processing section, the remote controller 30 and the remote controller interface 10 serving as an operation inputting section and the text addition section 35 serving as a database production section. However, according to the embodiment of the present invention, the components of the hard disk recorder 1 are not limited to them, but the database production apparatus of the embodiment of the present invention can be formed from a representative image selection section, a display processing section, an operation inputting section and a database production section of various other configurations.

While a preferred embodiment of the present invention has been described using specific terms, such description is for illustrative purposes only, and it is to be understood that changes and variations may be made without departing from the spirit or scope of the following claims.

What is claimed is:
1. A database method comprising:
 a representative image selection step of selecting a representative image which represents an image content from the image content;
 a characteristic information extraction step of executing a characteristic information extraction process concurrently with a recording process of the image content;
 a display processing step of causing a display apparatus to display the representative image;

an operation inputting step of allowing a user to input image text information corresponding to the representative image; and a database production step of registering representative characteristic information, extracted from the representative image in the characteristic information extraction step in accordance with a predetermined extraction method, in an associated relationship with the image text information inputted at the operation inputting step to produce a database for acquiring substance character information corresponding to an arbitrary image extracted from an arbitrary image content using characteristic information of the extracted arbitrary image, wherein the representative characteristic information represents a block of images including images similar to each other.

2. The database production method according to claim 1, wherein, at the representative image selection step, the representative image is selected using moving picture characteristic information produced from the image content in accordance with the extraction method.

3. The database production method according to claim 1, wherein, at the representative image selection step, the representative image is selected for a scene change.

4. The database production method according to claim 1, wherein, at the database production step, the image text information and a representative characteristic information identifier which represents the representative characteristic information are registered in an associated relationship with each other.

5. The database production method according to claim 1, wherein, at the representative image selection step, moving picture image characteristic information produced from the image content in accordance with the extraction method is recorded into a predetermined recording section and the representative image is selected using the moving picture image characteristic information.

6. The database production method according to claim 1, wherein, at the representative image selection step, moving picture image characteristic information extracted from the image content in accordance with the extraction method is recorded into a predetermined recording section and the representative image is selected using the moving picture image characteristic information; and at the database production step, a representative characteristic information identifier and the image text information are recorded into the database thereby to record the representative characteristic information and the image text information in an associated relationship with each other.

7. The database production method according to claim 1, wherein the image content is recorded in a predetermined recording section; and the database production method further comprises:

a reproduction step of reproducing the image content recorded in the recording section concurrently to the representative image selection step.

8. The database production method according to claim 7, wherein, at the display processing step, when a process at a reproduction step ends, the representative image is displayed on the display apparatus.

9. The database production method according to claim 1, further comprising:

an arbitrary inputting step of allowing the user to input image text information corresponding to a selection image selected by the user in accordance with a request of the user; and an arbitrary registration step of registering selection characteristic information extracted from the selection image in accordance with the extraction method and the image text information in an associated relationship with each other.

10. The database production method according to claim 9, wherein, at the arbitrary registration step, moving picture characteristic information corresponding to the selection image is acquired as the selection characteristic information from a recording section.

11. The database production method according to claim 1, wherein, at the operation inputting step, a database production process which includes the representative image selection step, display processing step, operation inputting step, and database production step is stopped in response to an operation input from the user.

12. The database production method according to claim 1, wherein, at the representative image selection step, the representative image is selected using sound characteristic information extracted from sound data which the image content has.

13. The database production method according to claim 1, wherein, at the representative image selection step, a first representative image and a second representative image are selected using moving picture characteristic information and the second representative image, which is not similar to the first representative image utilized as the extraction source of the representative characteristic information registered in the database, is selected as a new representative image.

14. The database production method according to claim 1, wherein, at the operation inputting step, the operation inputting step and the database production step regarding the representative image which is being displayed are omitted and a next representative image is displayed in response to an operation input from the user.

15. A non-transitory computer-readable medium for storing instructions for causing a computer to execute operations comprising:

a representative image selection step of selecting a representative image which represents an image content from the image content;

a characteristic information extraction step of executing a characteristic information extraction process concurrently with a recording process of the image content;

a display processing step of causing a display apparatus to display the representative image;

an operation inputting step of allowing a user to input image text information corresponding to the representative image; and a database production step of registering representative characteristic information, extracted from the representative image in the characteristic information extraction step in accordance with a predetermined extraction method, in an associated relationship with the image text information inputted at the operation inputting step to produce a database for acquiring substance character information corresponding to an arbitrary image extracted from an arbitrary image content using characteristic information of the extracted arbitrary image, wherein the representative characteristic information represents a block of images including images similar to each other.

16. A database production apparatus, comprising:

a processor;

a representative image selection section that uses the processor to select a representative image which represents an image content from the image content;

a hard disk for recording the image content;
an image analysis section that executes a characteristic information extraction process concurrently with recording of the image content on the hard disk;
a display processing section configured to cause a display apparatus to display the representative image;
an operation inputting section configured to allow a user to input image text information corresponding to the representative image;
a database production section that uses the processor to register representative characteristic information, extracted from the representative image in accordance with a predetermined extraction method, in an associated relationship with the image text information inputted by said operation inputting section to produce a database for acquiring substance character information corresponding to an arbitrary image extracted from an arbitrary image content using characteristic information of the extracted arbitrary image, wherein the representative characteristic information represents a block of images including images similar to each other; and
a memory to store the database.

17. An image content recording apparatus, comprising:
a processor;
a recording section configured to record an image content;
an image analysis section configured to extract characteristic information concurrently with recording of the image content;
a representative image selection section using the processor to select a representative image which represents the image content from the image content;
a display processing section configured to cause a display apparatus to display the representative image;
an operation inputting section configured to allow a user to input image text information corresponding to the representative image;
a database production section using the processor to register representative characteristic information, extracted from the representative image in accordance with a predetermined extraction method, in an associated relationship with the image text information inputted by said operation inputting section to produce a database for acquiring substance character information corresponding to an arbitrary image extracted from an arbitrary image content using characteristic information of the extracted arbitrary image, wherein the representative characteristic information represents a block of images including images similar to each other; and
a memory to store the database.

* * * * *